United States Patent [19]

Yamaguchi et al.

[11] Patent Number: 4,465,047

[45] Date of Patent: Aug. 14, 1984

[54] KNOCK DETECTING APPARATUS FOR COMBUSTION ENGINES

[75] Inventors: Hiroaki Yamaguchi, Anjo; Tadashi Hattori; Yoshinori Ootsuka, both of Okazaki, all of Japan

[73] Assignee: Nippon Soken, Inc., Nishio, Japan

[21] Appl. No.: 360,688

[22] Filed: Mar. 22, 1982

Related U.S. Application Data

[62] Division of Ser. No. 95,307, Nov. 19, 1979, Pat. No. 4,341,189.

[30] Foreign Application Priority Data

Jun. 4, 1979 [JP] Japan .................. 54-70494

[51] Int. Cl.³ .................. F02P 5/04; G01D 21/00
[52] U.S. Cl. .................. 123/425; 73/651; 73/654; 73/35; 123/435
[58] Field of Search .................. 73/35, 651, 654, 652, 73/658; 123/425, 435

[56] References Cited

U.S. PATENT DOCUMENTS

| | | | |
|---|---|---|---|
| 759,513 | 5/1904 | Frahm | 73/651 |
| 2,424,864 | 7/1947 | Treseder | 73/651 |
| 2,521,401 | 9/1950 | Ohman | 73/651 |
| 2,649,848 | 8/1953 | Armstrong | 73/651 |
| 2,906,117 | 9/1959 | Kennard | 73/651 |
| 3,795,006 | 2/1974 | Engdahl | 73/651 |
| 4,108,006 | 8/1978 | Wacter | 73/654 |
| 4,233,836 | 11/1980 | Yoneda | 73/654 |
| 4,305,298 | 12/1981 | Greenwood | 73/651 |
| 4,341,189 | 7/1982 | Yamaguchi | 73/651 |

FOREIGN PATENT DOCUMENTS

| | | | |
|---|---|---|---|
| 445470 | 2/1925 | Fed. Rep. of Germany | 73/651 |
| 926692 | 4/1947 | France | 73/651 |
| 973510 | 2/1951 | France | 73/651 |
| 743687 | 1/1956 | United Kingdom | 73/651 |
| 1317152 | 5/1973 | United Kingdom | 73/651 |

*Primary Examiner*—Ronald B. Cox
*Attorney, Agent, or Firm*—Cushman, Darby & Cushman

[57] ABSTRACT

A knock detecting apparatus for an internal combustion engine includes a vibrating sheet branched into a plurality of vibrating reeds by forming a recess from one end of the vibrating sheet. The vibrating reeds have different lengths, shapes or thicknesses, and the other end of the vibrating sheet is fixed to a supporting member which is secured to the engine thereby to allow the vibrating reeds to vibrate with different resonance characteristics in response to the vibration of the engine caused by the knocking. The vibration of the vibrating sheet is detected, for example, as a change in reluctance by forming a magnetic path through the vibrating sheet and air gaps respectively located between the free ends of the vibrating reeds and a core.

2 Claims, 16 Drawing Figures

KNOCK DETECTING APPARATUS FOR COMBUSTION ENGINES

This is a division, of application Ser. No. 95,307 now U.S. Pat. No. 4,341,189 filed Nov. 19, 1979.

BACKGROUND OF THE INVENTION

1. Field of the Invnetion

The present invention relates to a knock detecting apparatus for use in an ignition timing control system, etc., for internal combustion engines, which control system has a function to adjust the ignition timing to a predetermined knock level by detecting the knock from vibrations produced outside of the cylinder due to the pressure in the cylinder of the internal combustion engine.

2. Description of the Prior Art

It is generally known that there is a close correlation between the ignition timing and the pressure in the cylinder. In this regard, the cylinder pressure caused by the explosion of a mixture, when no knocking is produced, does not involve higher harmonics (which usually include frequency components of 5 KHz–10 KHz or 11–13 KHz and which are related to the bore diameter of the engine cylinder and generated by intermittent, rapid combustions), however, when knocking tends to occur higher harmonics begin to appear in the vicinity of a maximum value of the cylinder pressure, and by this effect a vibration or sound is generated outside of the cylinder. According to close observation of the internal pressure signals generated in the cylinder or the generation of vibration or sounds outside of the cylinder, it is revealed that at the beginning of the knock occurence (the trace knock) higher harmonics begin to appear at an engine crank angle at which the engine pressure reaches a maximum value, and when the intensity of the knocking increases gradually (from light knock to heavy knock), the higher harmonics appear to a great extent at the advance side (i.e. ignition side) of the maximum value of the internal pressure. Thus, the engine efficiency will be improved remarkably if generation of the vibration or sounds generated outside of the cylinder due to the knocking is detected accurately, and if the ignition timing is controlled by feeding back the detected data. However, the actual situation is that no knock detecting apparatus is available which is capable of detecting the knocking conditions precisely enough to provide the data to be fed back, and which can operate stably under severe surrounding conditions required for use with vehicles.

Generally, there are two types of detectors for such detections as mentioned above. One type utilizes a piezoelectric type acceleration detector which is generally used for detecting vibration, and the frequency characteristic of this detector is higher than the knocking frequency and this characteristic becomes flat below the resonance point (hereinafter referred to as a non-resonance type), and the other is a resonance type which is under study by the inventors of the present application and which exhibits resonance characteristic at the knocking frequency. As the resonance point in the non-resonance type is higher than the knocking frequency, the sensitivity in a low frequency band including the knocking frequency below the resonance point is almost constant. Accordingly, it is possible in principle to detect the knocking over the whole range of the knocking frequency. However, during the engine operation, vibration noise such as caused by a valve seating vibration occurs frequently, and the signal-to-noise (S/N) ratio of the knock signal to the vibration noise will be deteriorated. For this reason it is practically impossible to detect the knocking by the non-resonance type detector during high speed engine operation. Also it is difficult to detect slight knocking even during low speed operation since the overall detection sensitivity is low.

In the resonance type, the detection sensitivity is improved remarkably at a specific frequency near the resonance point, and since vibration noise having other frequencies is hard to detect, the S/N ratio at the knocking frequency and the sensitivity are improved remarkably.

However, the resonance type has also the drawback in that when the degree of resonance (the resonance sharpness Q) becomes high, the detection frequency range is necessarily narrowed. Hence, the higher the Q, the more difficult the knock detection becomes due to a shift of the resonance frequency, or due to a slight shift of the knocking frequency which changes depending on the state of combustion.

Eventually, it is necessary for an ideal knock detecting apparatus to have the S/N ratio and sensitivity comparable to that of the resonance type, over a wide range within the whole frequency band of knocking.

SUMMARY OF THE INVENTION

In view of the previously mentioned points, the object of this invention is to provide a knock detecting apparatus capable of detecting a weak knocking with a high S/N ratio and high sensitivity over the whole range of the knocking frequency band by designing it to have a vibrating sheet exhibiting a plurality of resonance characteristics in the knocking frequency band.

In this invention, since it is designed to have a plurality of resonance characteristics in the frequency band in which the knock occurs, and since the knock detection is performed by combining each resonance output, the present invention has achieved a remarkable improvement in overcoming the drawback which has been a problem in a non-resonance type detector having no resonance characteristic and in which a weak knocking can not be detected due to vibration noise (for example, valve seating vibrations) when the vehicle is running. Furthermore, to cope with another drawback in which, when the Q in resonance is made high, although the sensitivity is improved only in frequencies near the resonance point and noise is not effectively detected, on the other hand the detection frequency range becomes narrow and the knock detection is, at some times, hard because of the high Q and the narrow frequency range when the resonance point is shifted or a target knock frequency is shifted due to a change in knock frequency depending on the state of the combustion process, in this invention a frequency detection range with satisfactory sensitivity is widened by designing it to have a plurality of resonance points in the knock occuring frequency band thereby enabling detection of the knocking in any one resonance characteristic. As a result, the advantage of this invention is that the knock detection performance is greatly improved. In the constitution exhibiting a plurality of resonance points, a vibrating body is branched into a plurality of vibrating reeds by providing a recess therebetween and still forming the vibrating reeds integrally, and utilizing the resonance characteristic of each vibrating reed. Thus, the number of the resonance characteristics are determined merely by the number of branches. Further, to shape the vibrating reeds, it is only required to branch a vibrating body by forming a recess therein. For this reason, where the vibrating body is of a flat plate shape, it is possible to employ a low cost, simple working method such as diestamping, chipping, cutting, etc., and hence it is advantageous in manufacturing process, costs, etc.

DETAILED DESCRIPTION OF THE PREFERRED EMBODIMENT

Figure 1:
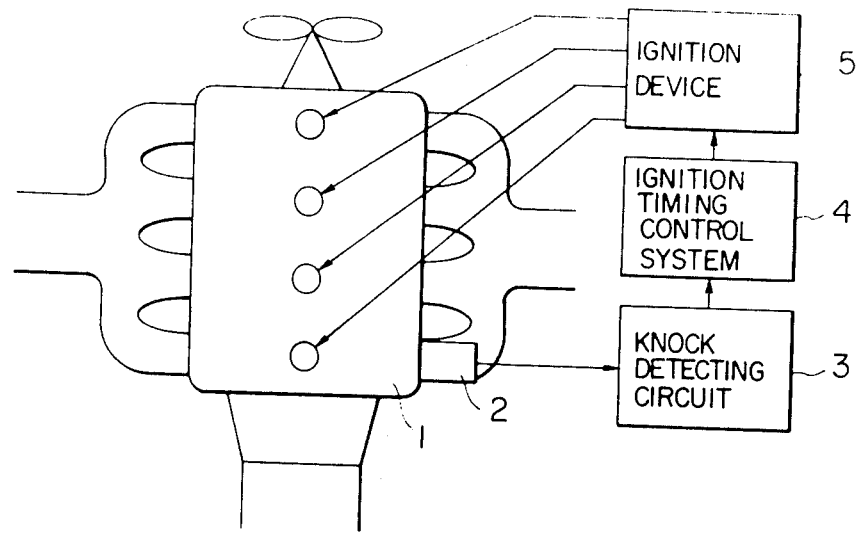
FIG. 1 is a schematic diagram illustrating a knock feedback ignition system to which a knock detecting apparatus in accordance with this invention is applied.

FIG. 1 is a schematic diagram of the knock feedback ignition system using a knock detecting apparatus in accordance with this invention. Numeral 1 is a four-cylinder internal combustion engine and a knock detector 2 is mounted by means of a screw or the like on the cylinder block portion of the engine 1. 3 is a knock detecting circuit for detecting the engine's knocking from an output signal of the knock detector 2. 4 is an ignition timing control system for controlling the ignition timing to an optimum position by advancing or retarding the ignition timing in response to the output of the knock detecting circuit 3. An output signal of this control system 4 ignites, the mixture by an ignition plug (not shown) mounted on the engine 1 through an ignition device 5 known in the art. The knock detecting circuit 3 used in this system detects an ignition signal which is not shown and performs sampling of noise components produced by engine vibration by using the output of the delector 2 for a predetermined time period or a predetermined range of crank angle just after the ignition where no knocking occurs in this period. Then the knock detecting circuits 3 detects the presence or absence of knocking by determining the ratio (the integrated value or mean value may be used) of the sampled noise component to the output of the knock detector 2 for a predetermined time period or a predetermined range of crank angle after the top dead center TDC (after the peak of cylinder pressure) where the knocking tends to occur in this period. Alternatively, the presence or absence of knocking may be determined not on the basis of a single signal but by processing a plurality of signals to obtain the probability of the presence of knocking. For example, the presence or absence of knocking may be determined based on how large a percentage (%) of knocking occurs for each hundred times of ignitions. The ignition timing control system 4 advances or retards the ignition timing in accordance with this determination of the presence or absence of the knocking. Explanation of the knock detecting circuit 3 and the ignition timing control system 4 as to their detailed constructions is omitted since these components are known. However, it will be apparent that the knock detector of this invention can be used with any type of system if the system is adapted to control the ignition timing by detecting the knocking.

Figure 2A:
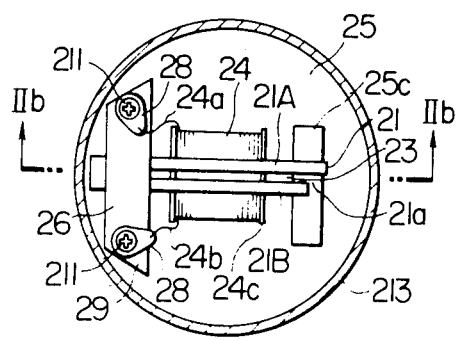
FIGS. 2a and 2b are respectively a cross-sectional view and a longitudinal sectional view (taken along the line IIb—IIb in FIG. 2a) of a first embodiment of the knock detecting apparatus according to this invention.
Figure 2B:
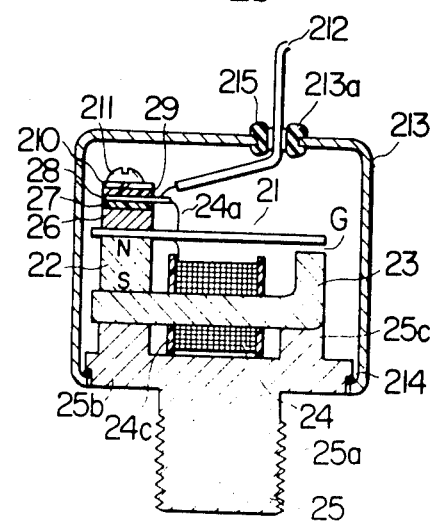

Next, the knocking detector of this invention will be described in detail. In the first embodiment shown in FIGS. 2a and 2b, 2 is a vibrating body (hereinafter referred to as a reed) made of a magnetic material (for example, iron, iron-nickel alloy, etc.) and has a plurality of response points resonating at knocking frequencies either between 5–10 kHz or 11–13 kHz. This reed 21 is formed by cutting out or diestamping a flat plate and the resonance characteristic is determined by the shape, thickness h, length l (the equivalent length from the fulcrum) and material. The resonance frequency is expressed by $f \propto h/l^2$. That is, the resonance frequency f is proportional to the thickness h and is inversely proportional to the square of the length l. A recessed portion 21a is provided in the reed 21 and the reed 21 is branched into reed pieces 21A and 21B, thus having two resonance characteristics. The reed pieces 21A and 21B are formed with somewhat different lengths and the resonance points are set to be respectively at 7.5 kHz for the reed piece 21A and at 8.5 kHz for the reed piece 21B.

Numeral 22 is a magnet having a magnetic force and 23 is an L-shaped core made of a material such as iron, iron-nickel alloy, ferrite, etc., which forms a magnetic path through the reed 21 and the magnet 22. In this magnetic path gaps G are provided between each of the reed pieces 21A and 21B and the core 23. Accordingly, the gaps G change when the reed 21 vibrates and in turn, a reluctance in the magnetic path changes. 24 is a coil for detecting a change in magnetic flux. A coil bobbin 24C is provided with an opening so that the core 23 can pass through the bobbin center, and a conductor for the coil 24 is wound about the circumference of the bobbin 24C. Furthermore, with regard to the coil 24 and the core 23, to prevent change in magnetic flux interlinkage due to a change of the relative position therebetween, the bobbin 24C is secured to the core 23 by means of an adhesive or the like. 25 is a housing made of iron, brass, etc., having at the lower portion a threaded portion 25a to attach the detector 2 to the cylinder block and having at the upper portion supporting portions 25b and 25c for mounting the core 23 thereon. 26 is a keep bar for holding each member forming the previously mentioned magnetic path, and together with the keep bar 26, insulating plates 27 and 29, a lug plate 28 fixed thereto, coil output terminals 24a and 24b, and a washer 210, one end of the reed 21, the magnet 22 and the core 23 are fixed rigidly by a screw 211 to the supporting portion 25b of the housing 25. After the coil output terminals 24a and 24b are fixed by soldering or caulking to the lug plate 28, an output is delivered through a lead line 212. 213 is a cover attached to the housing 25 by caulking after sandwiching a sealing material 214 such as rubber or the like, and 213a is a hole for taking out the lead line 212. 215 is a rubber bushing for passing the lead line 212 therethrough. This detector 2 is secured rigidly to the cylinder block by the threaded portion 25a so that it vibrates together with the cylinder block as a unit.

Next, the operation of the detector 2 will be described. As mentioned previously, the detector 2 is mounted on the cylinder block by fastening the threaded portion 25a. Accordingly, the knocking vibration generated in the cylinder block are transmitted to the reed 21 through the housing 25, and each reed piece 21A, 21B vibrates in accordance with the frequency and strength of this vibration, and further the proper vibrations of their own are also added thereto because one end of each reed piece is fixed. At this time, as the core 23, coil 24 and magnet 22 are made rigidly so as to vibrate integrally with the housing 25, only each reed piece 21A, 21B vibrates relatively in the magnetic path in correspondence with the knocking vibration, and hence the distances of the gaps G change in accordance with the knocking. In this case, since the core 23 and each reed piece 21A, 21B are designed to pass predetermined magnetic flux from the magnet 22, the change of the air gaps G causes a change in magnetic flux in the magnetic path. The coil 24 detects the change in this magnetic flux, that is, the vibration due to the knocking as a voltage. The detected voltage signal is delivered to the knock detecting circuit 3 through the lead line 212.

In this case, the voltage generated in the coil 24 is delivered as an output representing a combined value of the vibrations of the reed pieces 21A and 21B because the respective vibrations of the reed pieces 21A and 21B are substantially independent of each other. In other words, two resonance characteristics can be detected by the signal coil 24, and hence the detector 2 has a high detection sensitivity especially at the frequencies near the two resonance points. In short, in this example, the recess 21a is formed in a magnetic plate to branch so that the branched ends resonate individually, and thus the resonances of the reed pieces 21A and 21B are detected by the coil 24 as a magnetic flux change in a single magnetic path. That is, it is not necessary to provide a plurality of detecting coils even if a plurality of resonating reed pieces are formed, and hence a simple and inexpensive construction can be achieved. The materials used in this example are chosen so that the strength as well as durability are sufficient for use in automobiles, and the whole detector is also of a high vibration resistance and durability.

Figure 3A:
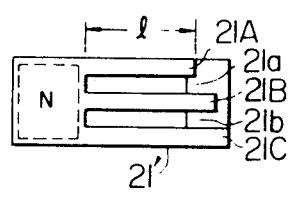
FIGS. 3a, 3b and 3c are respectively a simplified plan view, simplified front view, and a graph of an output characteristic of a second embodiment of the knock detecting apparatus according to this invention.
Figure 3B:
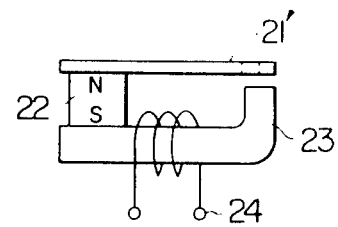

FIGS. 3a and 3b are simplified construction diagrams of the second embodiment in which two recesses 21a and 21b are formed in a reed 21', and the reed 21' is branched into three reed pieces 21A, 21B and 21C.

A concrete construction can be realized easily by incorporating the above reed 21' in place of the reed 21 in FIG. 2.

Figure 3C:
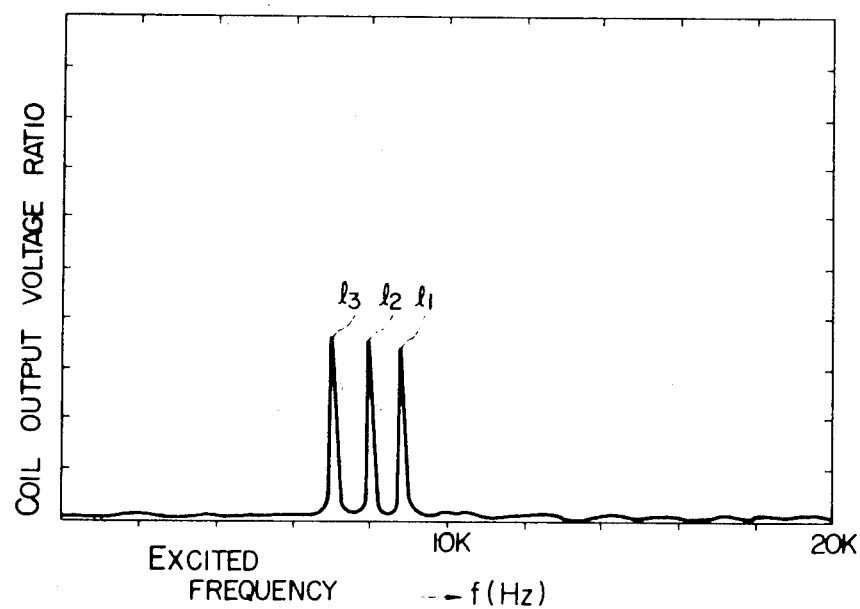

FIG. 3C shows a result of the actual measurement of the coil output voltage by a frequency analyzer, in which a detector is constructed by using the reed 21' shown in FIGS. 3a and 3b, and this detector is mounted on a vibration machine. An exciting force is 2G (converted into 1G), and the ordinate in this Figure represents the coil output voltage ratio which is obtained from the coil output voltage per unit acceleration and the abscissa represents the frequency f. The lengths $l_1$, $l_2$ and $l_3$ of the reed pieces 21A, 21B and 21C are respectively made to be 10 mm, 11 mm and 12 mm. As will be seen from FIG. 3C, when the reed 21 provided with recesses which are branched (an iron plate is worked to form recesses and the lengths of the branches are made different) a plurality of resonance characteristics with a high S/N ratio are obtained even when a single magnetic path and a single coil are used. The number of resonance characteristics is simply determined by the number of recesses (or the number of branches) and the number is not restricted. Accordingly, if suitable branches (e.g., which provide five resonance characteristics with a pitch of 1 kHz or 500 kHz) are provided in either of the knock frequency hands, 5-10 kHz and 11-13 kHz, it is possible to detect the knocking with high sensitivity and ease over the whole range of the frequency hand. If the width, material, thickness and shape of the reed 21 are prescribed, the resonance point is determined solely by the length. Accordingly, it is easy to set the resonance frequency.

Furthermore, the resonance characteristic is sharp and the knock detection sensitivity is improved, and at the same time the sensitivity for vibration noise components in other frequencies is lowered. Consequently, it is possible to detect weak knocking satisfactorily and the detecting frequency range can be widened as a result of the summation of individual frequency ranges, and thus high sensitivity and S/N ratio are obtained over the whole range of knock frequencies and the knock detection accuracy is improved remarkably. Furthermore, the knocking can be detected satisfactorily even if the knocking frequencies change depending on the combustion process.

Each of the detectors described hereinabove, has additionally a vibration property including the damper characteristic due to the fact that a magnetic force of the magnet 22 is prevailing in the air gaps G and the reed 21 is attracted in one direction by this attractive force. This fact has the following effects in that as soon as the knocking is over (as previously mentioned, the knocking is generated at a specific range of crank angles), the attractive force acts to stop the vibration of the reed 21 and the output is produced in the detector 2 only in the range in which the knocking is generated. This effect of the damper characteristic is greatly enchanced when the magnetic force is strengthend further.

In the manner of obtaining a plurality of resonance characteristics by forming a recessed portion in one end of the reed, even if the resonance frequency changes depending on the shape of the recessed portion, there is no difference in the fact that a plurality of detection characteristics can be produced in principle.

Figure 4A:
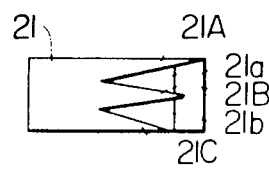
FIGS. 4a and 4b are respectively a simplified plan view and a simplified front view showing a third embodiment of the knock detecting apparatus according to this invention.
Figure 4B:
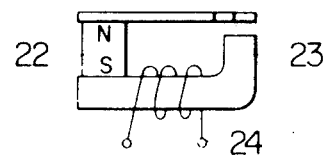

For example, FIGS. 4a and 4b are simplified construction diagrams showing the third embodiment of the knock detector, and in this Figure the shape of recessed portions 21a and 21b are made triangles and the tip of each of the reed pieces 21A, 21B and 21C are made narrow. There is some difference in the resonance frequency and vibration characteristic between the detectors of FIG. 3 and FIG. 4 because their shapes are different, however there is no change in that three resonance characteristics can be obtained in both cases.

Figure 5A:
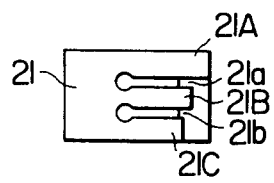
FIGS. 5a and 5b are respectively a simplified plan view and a simplified front view showing a fourth embodiment of the knock knock detecting apparatus according to this invention.
Figure 5B:
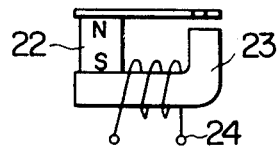

FIG. 5, including 5a and 5b, shows the fourth embodiment in which a circular hole is provided at each fork of adjacent reed pieces 21A and 21B, 21B and 21C and the circular hole is made larger than the width of a recess between the reed pieces. In this case, three resonance points are obtained.

Eventually, in the reed of this flat plate type, the number of resonance characteristics is determined solely depending on the number of branches, and not depending on the shape.

Furthermore, if only this vibration detector is capable of causing a change in magnetic flux by the resonance of the reed, there is no particular restriction as to the manner of producing the magnetic force or the manner of detecting the magnetic flux. For example, FIGS. 6a and 6b show the fifth embodiment in which an electromagnet is constructed by winding a coil 24 for detecting and a coil 22' for exciting about a U-shaped core 23', and by supplying current to this coil 22' from a power source Ba.

Figure 6:
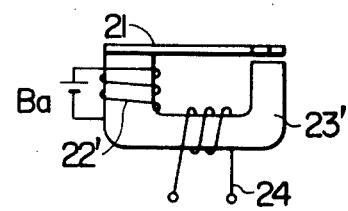
FIG. 6 is a simplified front view of a fifth embodiment of the knock detecting apparatus according to this invention.
Figure 7:
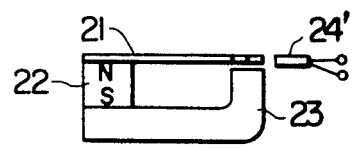
FIG. 7 is a simplified front view of a sixth embodiment of the knock detecting apparatus according to this invention.

Furthermore, FIG. 7 shows the sixth embodiment in which as a magnetic detecting means for detecting a change in reluctance in a magnetic path, a magnetosensitive element 24' such as a magnetoresistive element, a Hall element, etc., located adjacent to gaps G is used in place of the coil 24 in FIG. 6. A plurality of resonance characteristics can be detected sufficiently by a single magnetic detecting means, if such a detecting means is of the type which detects by combining the magnetic flux changes due to the plurality of resonance characteristics. However, of course, a plurality of magnetic detecting means may be used.

Figure 8A:
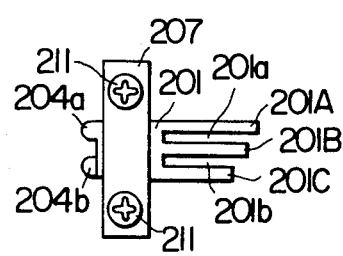
FIGS. 8a and 8b are respectively a plan view and a longitudinal sectional view showing a main part construction of a seventh embodiment for the knock detecting apparatus according to this invention.
Figure 8B:
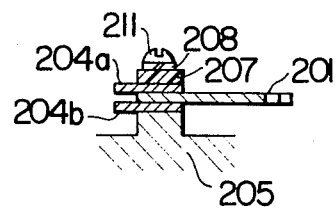

Furthermore, the materials of the resonance reed are not specially restricted. FIG. 8, including 8a and 8b, shows the seventh embodiment in which a sheet of piezoelectric element is molded or backed after punching to form recesses 201a and 201b and a plurality of resonance characteristics are provided. In the FIGS. 8a and 8b, 201 is a reed of a piezoelectric element which vibrates in accordance with the vibrations of the engine, and the reed 201 has three reed pieces 201A, 201B and 201C of different lengths. 204a and 204b are electrodes for delivering an output by combining a plurality of resonance characteristics produced by the reed pieces 201A, 201B and 201C. 205 is a housing (partially shown) to which the reed 201 is secured by a screw 211 together with a spring washer 208 and a spacer 207 made of an electrical insulator, and the housing 205 is provided with a threaded portion (not shown) to mount the housing 205 on the engine.

According to the seventh embodiment, reed pieces 201A, 201B and 201C of the reed 201 made of piezoelectric element vibrate respectively since these reed pieces have individual resonance characteristics, and a voltage signal having a combined plurality of resonance characteristics is delivered at the electrodes 204a and 204b, and thus the knocking is detected.

Figure 9A:
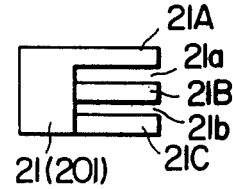
FIGS. 9a and 9b are respectively a front view and a cross-sectional view of a vibrating plate showing an eighth embodiment of the knock detecting apparatus according to this invention.
Figure 9B:

Furthermore, as the eighth embodiment shown in FIGS. 9a and 9b, by changing the thickness t of each of reed pieces 21A, 21B and 21C, it is possible to make difference in resonance characteristic of the lead pieces 21A, 21B and 21C. Thus, it is possible to displace the resonance position by changing any of the length, thickness and shape.

We claim:

1. A knock detecting apparatus for an internal combustion engine comprising:
    a housing secured to said combustion engine;
    a permeable core arranged in secured relation to said housing;
    a magnet for generating magnetic flux;
    a single vibrating plate of a magnetic material branched into a plurality of vibrating reeds having different lengths, adjacent ones of said reeds being separated by a recess in said vibrating plate from one end thereof, said vibrating reeds being integral at the other end of said vibrating plate and having respective resonance characteristics in different frequency bands within a frequency range of the knocking of said combustion engine,
    said recess includes one portion near the edge of said plate of a rectangular shape and another portion adjacent said one portion and on the side of said one portion opposite the edge of said plate, said another portion being a circular shape, said another portion having a diameter larger than the width of said one portion,
    said other end of said vibrating plate being fixed to one end of said permeable core through said magnet and said one end of said vibrating plate being spaced from the other end of said permeable core to define respective variable air gaps,
    said plurality of vibrating reeds and said respective variable air gaps forming different magnetic paths for the magnetic flux which further passes through said permeable core and said magnet; and
    a coil wound on said permeable core for generating electric signals in response to changes in the magnetic flux passing through said core caused by respective changes in said variable air gaps.

2. A knock detecting apparatus for an internal combustion engine comprising:
    a housing secured to said combustion engine;
    a permeable core arranged in secured relation to said housing;
    a magnet for generating magnetic flux;
    a single vibrating plate of a magnetic material branched into a plurality of vibrating reeds having different lengths, adjacent ones of said reeds being separated by a recess in said vibrating plate from one end thereof, said plurality of vibrating reeds being integral at the other end of said vibrating plate and being respectively triangular in shape and having respective resonance characteristics in different frequency bands within a frequency range of the knocking of said combustion engine,
    said other end of said vibrating plate being fixed to one end portion of said permeable core interposing said magnet therebetween and said one end of said vibrating plate being spaced from the other end portion of said permeable core to define respective variable air gaps,
    said plurality of vibrating reeds and said respective variable air gaps forming different magnetic paths for the magnetic flux which further passes through said permeable core and said magnet; and
    a coil wound on said permeable core for generating electric signals in response to changes in the magnetic flux passing through said core caused by respective changes in said variable air gaps.

* * * * *